3,238,966
FLUID OPERATED CONTROL VALVE AND
GAS CONTROL SYSTEM
Charles N. Howard, 95 Kings Highway, and Carl E.
Latta, 2224 Adams Ave., both of Huntington, W. Va.
Filed June 28, 1963, Ser. No. 291,518
2 Claims. (Cl. 137—488)

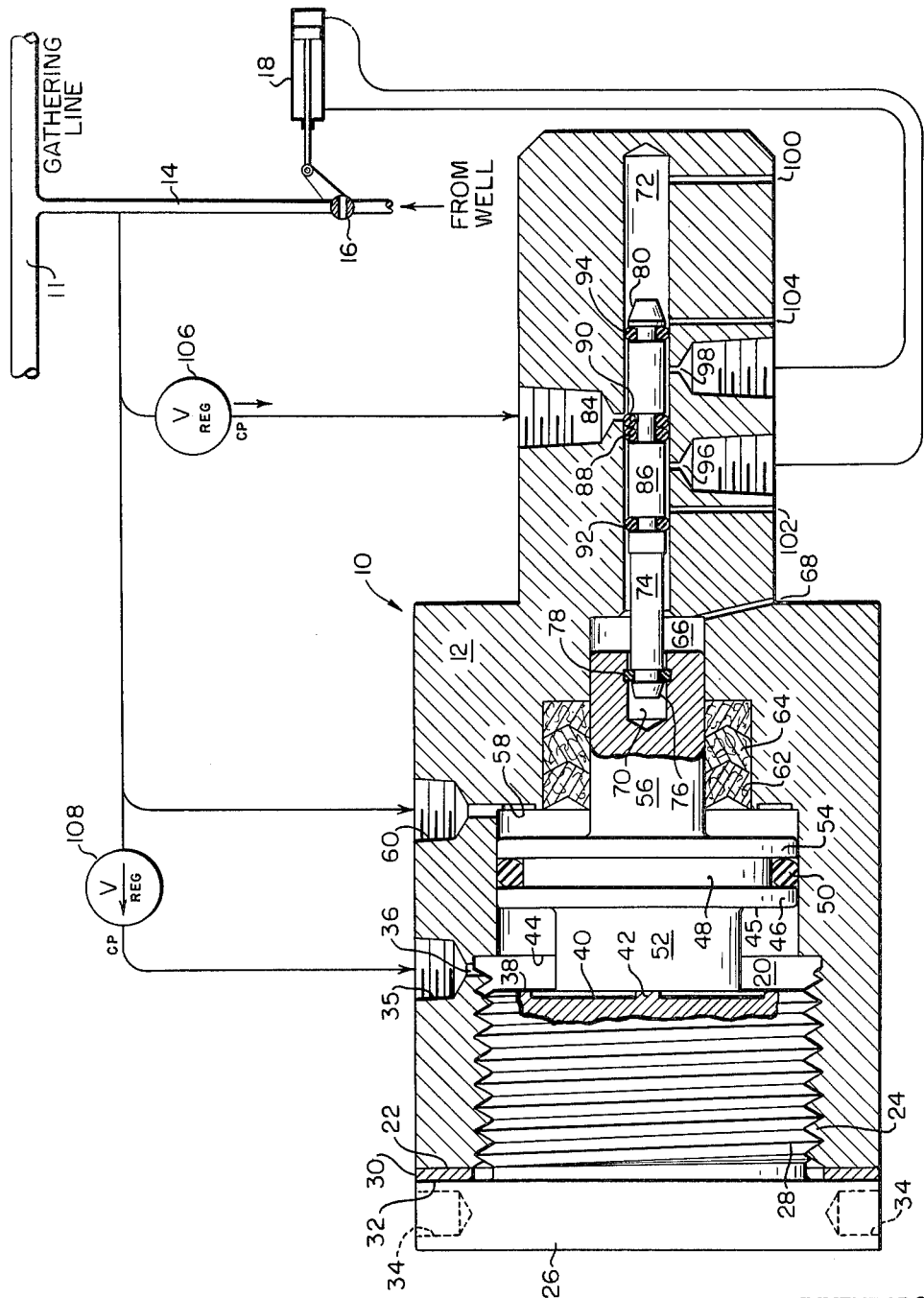

Our invention relates generally to control valves and more particularly to fluid operated control valves for actuating system supply valves in response to changes in system pressure.

In the production of natural gas it is common to have a plurality of gas producing sources which are connected into a gas gathering line. It is also customary to provide storage facilities, as for example repressurized spent gas wells, in the gathering line system so that a generally constant gas output may be obtained despite fluctuating supply conditions within the system. These wells are charged with gas during slack periods and supply gas to the gathering line when demand increases.

To both protect the valves, regulators, and other fittings of the storage well system and to make most efficient use of the storage wells, it is desirable to have some means for automatically connecting the repressurized wells to the gathering line system when the pressure in the gathering line drops below a desired minimum level and for automatically disconnecting the repressurized wells from the system when the gathering line pressure reaches a desired maximum level.

Accordingly, an object of our invention is to provide an automatically operated control valve for use in connecting or disconnecting a repressurized well to the system as may be required.

A further object of our invention is to provide an automatically operated control valve which will be actuated by the fluid medium contained within the gathering line system and which does not require an external source of power.

A still further object of our invention is to provide automatic control valve and pressure control apparatus which will operate properly and decisively under marginal operating conditions, which is simple and rugged in construction, is free of excessive exterior linkage, and is sensitive over a wide range of pressure. In a preferred embodiment thereof of our invention, we provide a pressure operated valve actuator and control valve which in turn operates a conventional valve actuator and shut-off valve for use in connecting and disconnecting a repressurized storage well to a gas gathering line. The shut-off valve is placed in the gas line from the well to the gathering line and is actuated by a pneumatic cylinder. The pressure operated valve actuator and control valve of our invention includes a control valve which controls the fluid supply to the shut-off valve operating cylinder. Gas is taken from the gathering line system for this purpose. The control valve is in turn actuated by a piston, one side of which is provided with gas from the gathering line at gathering line pressure or another preselected relatively high pressure. The other side of the piston, which has a preselected larger gas contacting surface area, is provided with a regulated relatively high or relatively low pressure such as regulated line pressure to establish the gas pressure at which the control valve actuator will operate.

If the gathering line pressure is normal, the piston of the valve actuator is positioned so that the control valve causes the valve operating cylinder to close the shut-off valve between the well and the gathering line. When the gathering line pressure drops below a desired minimum the control valve actuator piston shifts, thereby actuating the control valve which in turn actuates the valve operating cylinder to open the gas shut-off valve in the line from the storage well. When gathering line pressure reaches the desired level, the piston moves back to its first position and the shut-off valve is again closed.

It is a feature of our invention that gas taken from the gathering line is utilized both as a sensing medium and also as a power source for actuating the control valve and the shut-off valve.

It is a further feature of our invention that the piston is moved by a substantially large volume of gas which insures that once movement of the piston has begun it will complete its stroke.

Another feature of our invention is that the automatic valve is small in size and may be located in an adverse environment some distance from centralized control stations.

These and other objects and features of our invention will appear as the description proceeds with the aid of the accompanying drawing, which is a side view in cross-section of the control valve actuator and control valve of our invention showing diagrammatically its connection into a gathering line system.

In the drawing the combined valve actuator and control valve of our invention indicated generally at 10, is shown in use in a gas producing system including a gatherine line 11. A spur line 14 is shown connecting the gathering line 11 with a repressurized gas well (not shown). A shut-off valve 16 of conventional design is provided in the spur line 14 to connect or disconnect the well and the gathering line 11. The shut-off valve 16 is operated through the movement of a piston in a cylinder 18 also of conventional design. As will be hereinafter described, the gas to operate the shut-off valve actuating cylinder 18 is controlled by the control valve included in the combined actuator and control valve 10 of our invention.

The assembly 10 includes a unitary body member 12, characterized by a plurality of series connected cylindrical bores each of a lesser internal radius than the preceding one are provided within the body 12. Thus a first bore 20 has an annular end face 22 which forms one end of the body 12. The bore 20 is provided with internal screw threads 24 to receive an end closure or plug 26 which is provided with cooperating external screw threads 28. An annular sealing gasket 30 is positioned between the annular end face 22 of the body 12 and a corresponding annular face 32 on the plug 26. The plug 26 may also be provided with wrench-receiving drill holes 34 to facilitate insertion and removal thereof.

The plug 26 in inserted condition shown extends less than the full axial depth of the bore 20. At a point stationed farther in the bore than the point of furthest travel of the internal end of the plug 26 an inlet port 36 is formed through the body 12. The external portion 35 of the port 36 is drilled and tapped to receive a pneumatic connector (not shown).

The innermost end of the plug 26 is provided with a substantially flat end face 38 generally normal to the principal axis of the bore 20. The face 38 is cut-away at its central portion, indicated generally at 40, leaving only an upstanding element 42 which lies in the plane of the end face 38.

Adjacent the bore 20 and communicating therewith is a second coaxial cylindrical bore 44 of slightly smaller radius. Located within the bore 44 is a piston 46 which is slideable along the principal axis of the bore 44. The piston 46 has a central circumferential groove 48 in which resides an O-ring gasket 50 which serves as a sliding seal against the internal walls of the bore 44.

The face 45 of the piston 46 adjacent the bore 20 and plug 26 is provided with a central upstanding portion 52 which is initially dimensioned to abut the element 42 of the plug 26 when the piston is in the position shown in the drawing.

The piston 46 has a second face 54 opposed to the face 45. A cylindrical stem 56 extends from the face 54 as will be hereinafter described. The face 54 is annular in configuration and is of less area than the face 45. An annular port 58 is formed in the body 12 at the end of the bore 44 furthest from the plug 26. The annular port 58 is provided with an external portion 60 which is drilled and tapped to receive a pneumatic connector (not shown).

A third coaxial bore 62 is formed in the body 12 adjacent the bore 44 and communicates therewith. The stem 56 of the piston 46 passes through the bore 62. Suitable rubber or other packing 64 is provided in the bore 62 and serves to seal the stem 56 in a fluid tight manner. The packing 64 is, however, sufficiently loose that movement of the stem 56 is permissible.

A fourth coaxial bore 66 is formed in the body 12 communicating with the bore 62 and into which the end of the stem 56 is received. The bore 66 has a slightly greater radius than the stem 56 and a sliding fit is provided. At its further end the bore 66 is vented to atmosphere through a vent 68 which is formed in the body 12. The bore 66 is of sufficient depth to permit full travel of the piston 46 in the bore 44.

An internal bore 70 is provided in the end of the stem 56 along the longitudinal line thereof. A sixth and smallest bore 72 is formed in the body 12 in axial alignment with the bore 70 in the stem 56 and of approximately the same radius. A shuttle member 74 resides in the bore 72 and extends into the larger bore 66. An end 76 of the shuttle member 74 is received in the bore 70 in the stem 56 and held therein by an O-ring 78 which is engaged in a suitable groove in the bore 70. The shuttle member 74 extends from the bore 70 through the bore 66 and into the bore 72. It is dimensioned initially such that when in its furthest inward position an end 80 of the shuttle will not meet the bottom of the bore 72.

The shuttle 74 acts as a switching valve to control the valve actuating cylinder 18. This is accomplished by forming a port 84 through the body 12 which communicates with the bore 72. Gas under pressure is admitted through the port 84 to the bore 72. The shuttle 74 is provided with a portion 86 having a larger radius and fitted with sealing O-ring gaskets to provide a switching element. A pair of O-rings 88 and 90 are fitted at the center of the portion 86 and other O-rings 92 and 94 are positioned at opposite ends thereof respectively. A pair of ports 96 and 98 are likewise provided through the body 12. The bore 72 is vented at its furthest end to atmosphere through a vent 100. Additional vents 102 and 104 are provided into the bore 72 to complete the switching valve structure.

When the shuttle 74 is in the position shown in the drawing it will be noted that fluid under pressure entering the body 12 through the port 84 will pass into the bore 72 and will exit through the outlet port 98. Likewise, when the shuttle is shifted to the right a sufficient amount, the fluid entering through the port 84 will exit through the outlet port 96. In the position shown any fluid entering the bore 72 through the outlet port 96 will be vented through vent 102 and conversely when the shuttle is in the second position any fluid entering the bore through the outlet port 98 will be vented through the vent 104.

The manner of connecting our invention into the gas control system will now be described. The gas operated shut-off valve actuating cylinder 18 is connected as shown to the outlet ports 96 and 98 that is: to either side of the actuating piston the cylinder 18 which is mechanically linked to the shut-off valve arm, and in such a fashion that when pressure is applied at the port 98 the shut-off valve will be closed and when pressure is applied at the port 96 the shut-off valve will be opened.

As indicated diagrammatically, the spur line 14 is tapped to provide the power to operate our valve. A regulating valve 106 is positioned in the tapped line and is adjusted to provide sufficient pressure at the inlet port 84 to operate the valve actuating cylinder 18. In the preferred embodiment a pressure of about 200 pounds per square inch is used.

Actual gathering line pressure is transmitted to the bore 44 through the annular port 58 formed in the body 12 as may be seen diagrammatically. A second regulating valve 108 is used in the system to reduce the actual gathering line pressure to approximately 5 pounds per square inch less than the desired minimum line pressure, which regulated pressure is applied at the port 36 in the bore 20 as shown diagrammatically.

In operation with the piston, shuttle, packing and O-rings in assembled condition the plug is inserted into the body of the valve in such a fashion to permit the O-ring gasket 50 to be slideably reciprocating within bore 44. The shut-off valve actuating cylinder is connected to the outlet ports 96 and 98 in such fashion that pressure applied at the port 98 will cause the shut-off valve to be closed. Operating pressure is provided for the shut-off valve operating cylinder 18 through the regulator 106 which is adjusted to apply 200 pounds pressure at the inlet port 84. The regulator 108 is then adjusted to 5 pounds per square inch less than the desired minimum gathering line pressure, which regulated pressure is applied at the port 36. Actual gathering line pressure is applied at the port 58.

It will be noted that the piston 46 has a larger face area on the side which is adjacent the plug 26. This area is the total side area of the piston less that area which is occupied by the element 42 in the plug. It will be observed, however, that the face area on the opposite side of the piston is reduced by the cross-section area of the stem 56. Since the cross-sectional area of the piston face 54 is greater than the cross-sectional area of the piston face 45, it will be observed that when gas is admitted through the ports 58 and 36 respectively at equal pressure the piston will move from the position shown in the drawing toward the right until the face 54 thereof comes to rest against the bottom of the bore 44.

Since gas pressure at the face 45 of the piston is regulated to five pounds less than the desired minimum gathering line pressure it will be observed that if the actual gathering line pressure which is applied to the face 54 of the piston should drop to approximately the same level as the regulated pressure applied to the face 45 the piston will shift from the position shown in the drawing and move toward the right until it meets the bottom of the bore. The movement of the piston will be decisive and complete, because of the substantially large volume of gas involved. As a result, once the desired operating condition has been reached, proper actuation of our valve is assured.

Shifting of the piston 46 toward the right likewise causes the shuttle 74 to shaft toward the right a sufficient distance to cause the centrally mounted O-rings 88 and 90 to move to the right beyond the inlet port 84 whereby the pressure applied at the port 84 will be transmitted through the outlet port 96 to the valve actuating cylinder 18. The cylinder will then shift the shut-off valve 16 connecting the repressurized well to the gathering line. When the actual gathering line pressure has again attained a satisfactory level the piston will shift back to the position shown in the drawing and the shuttle will again operate to cause the shut-off valve actuating cylinder to again close the shut-off valve.

While the illustrated embodiment of our invention has been shown for use in an illuminating gas gathering line system having operating pressures well in excess of two hundred pounds per square inch, the pressure required to operate the illustrated shut-off valve actuating cylinder, it will be understood that the valve of our invention is suitable for use in any similar system and may be operated by other fluid media than natural gas such as oil, water, steam etc.

The effective face surface area of the piston faces 45 and 54 may be preselected to provide for shut-off valve activation at any preselected relatively high or low pressure levels from the pressure of the gas source. If desired the fluid pressure supplied to one of the piston faces or to port 84 to activate cylinder 18 may be a relatively high or low pressure fluid from a separate external source of the same of different character than the fluid pressure being maintained such as compressed air, steam, gas from a bottled gas cylinder etc. Additionally, our invention has been shown in one embodiment wherein the shuttle provides remote pneumatic operation of a cylinder and a shut-off valve. However, where the shut-off valve force required to open and close the valve is sufficiently small, the pneumatic switching operation of the shuttle and the supplying of fluid pressure to port 84 may be eliminated. In this operation the shuttle itself suitable supported for slideable reciprocating motion may be directly and mechanically linked to the shut-off valve or other fluid flow control means so that movement of the shuttle will effect the desired operation. Also it is within our contemplation that two or more gathering lines may be used to monitor the pressure of other lines by employing the pressure from one gathering line on one side of the piston face and the pressure of one or more monitored lines on the opposite side.

Having thus described and illustrated a preferred embodiment of our invention, it is our intention to claim all changes and modifications thereof which are not inconsistent with the spirit and scope of the appended claims.

What we claim as new and desire to secure by Letters Patent of the United States is:

1. A control valve including a housing characterized by a plurality of series-connected, concentric, bores of successively diminishing smaller internal radii; an end plug inserted in a fluid-tight manner into a first bore at the one end of the housing, the plug extending less than the full depth of the first bore, the inner face of the plug having an upstanding element in the plane of the face; a first port communicating with the first bore and positioned slightly beyond the inner face of the end plug and capable of placing the first bore in a fluid-flow communication with a relatively low pressure source; a piston within a second bore and adapted for fluid-tight, reciprocating movement within the second bore, the piston characterized by a first face and a second face, the first face having a preselected surface area greater than the second face and further characterized by a central upstanding element; a second port in fluid flow communication with the second bore and capable of placing the second face of the piston in fluid flow communication with a relatively high pressure source; a stem element extending from the second face of the piston into a third bore containing sealing material which permits the fluid-tight reciprocating movement of the stem element within the bore, which stem element extends into a fourth bore characterized by a vent opening placing the bore in fluid flow communication with the atmosphere; a shuttle member connected to and extending from the stem element and adapted for fluid-tight movement within a fifth bore, the shuttle member containing a series of peripheral sealing means dividing the bore into a series of fluid-tight internal chambers; an inlet port capable of placing a pressure-actuating source in fluid flow communication with the fifth bore; first and second outlet ports capable of placing the fifth bore in fluid flow communication with an external pneumatical operated device; vent openings positioned to vent actuating pressure within the fifth bore to the atmosphere whereby upon movement of the piston and the shuttle member, a fluid flow path is connected and disconnected between the first inlet port and the first and second outlet ports.

2. A gas control system which system comprises, a gas gathering line, a source of relatively high pressure gas; means placing the gas gathering line in gas flow communication with the source of high pressure gas which means includes a gas flow control valve; actuating means responsive to gas pressure to actuate said gas flow control valve; a control valve including a housing characterized by a bore; a piston within said bore adapted for fluid tight reciprocating movement within the bore; said piston having a first face and a second face, the first face having a preselected greater surface area than the second face; a first port in gas flow communication with the first face; a second port in gas flow communication with the second face; a shuttle member within a second bore in said housing and connected to and extending from said piston, the shuttle member adapted for fluid tight reciprocating movement within the second bore and the shuttle member having a plurality of sealing means; an inlet port and first and second outlet ports in fluid flow communication with the second bore whereby movement of the shuttle member from a first position to a second position, orients the sealing means to connect and disconnect a fluid flow path between the inlet port and the first and second outlet ports; means placing the gathering line in gas flow communication with the inlet port, means placing said valve actuating means in gas flow communication with the first and second outlet ports, respectively; means placing the second port in gas flow communication with the gathering line; means placing the first port in gas flow communication with the gathering line which means includes a pressure regulating valve to limit the pressure applied to the first face of said control valve piston to a preselected value, whereby whenever the gas pressure in the gathering line rises above a preselected maximum gas pressure, the piston will decisively and automatically move from a first to a second position changing the gas flow path through the second bore, thereby disconnecting the source of high pressure gas from the gathering line.

References Cited by the Examiner

UNITED STATES PATENTS

| | | | |
|---|---|---|---|
| 1,893,462 | 1/1933 | Wait | 137—488 |
| 2,082,940 | 6/1937 | Brisbane et al. | 137—488 |
| 2,582,626 | 1/1952 | Escher | 137—488 X |
| 2,727,530 | 12/1955 | Grove et al. | 137—505.28 |
| 2,819,935 | 1/1958 | Grad | 92—152 X |
| 3,007,492 | 11/1961 | Grimmer | 137—488 X |
| 3,043,331 | 7/1962 | Peters | 137—492 X |
| 3,083,726 | 4/1963 | Woelfel | 137—488 X |

MARTIN P. SCHWADRON, *Acting Primary Examiner.*

M. CARY NELSON, *Examiner.*